US008139864B2

(12) United States Patent  
Standfield et al.

(10) Patent No.: US 8,139,864 B2  
(45) Date of Patent: Mar. 20, 2012

(54) SYSTEM FOR NON-UNIFORMITY CORRECTION FOR IMAGE PROCESSING

(75) Inventors: Matthew R. Standfield, Dallas, TX (US); Jim D. Allen, Tulsa, OK (US); Michael O'Neal Fox, Bixby, OK (US); Deepak Prasanna, Rockwall, TX (US); Matthew P. DeLaquil, Rockwall, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 750 days.

(21) Appl. No.: 12/340,123

(22) Filed: Dec. 19, 2008

(65) Prior Publication Data

US 2010/0158407 A1  Jun. 24, 2010

(51) Int. Cl.  
*G06K 9/46* (2006.01)

(52) U.S. Cl. ........... 382/190; 345/611; 348/246; 712/10

(58) Field of Classification Search .................. 382/100, 382/142, 190, 194, 195, 270, 275; 345/611–616, 345/600–602, 694; 348/246, 247; 712/10–18  
See application file for complete search history.

(56) References Cited

U.S. PATENT DOCUMENTS

| 5,455,622 | A  | * | 10/1995 | Compton ................ 348/229.1 |
| 8,023,013 | B1 | * | 9/2011  | Linzer et al. ................ 348/247 |
| 2002/0005862 | A1 | * | 1/2002  | Deering ........................ 345/694 |
| 2002/0196264 | A1 | * | 12/2002 | Goetz ........................... 345/611 |
| 2004/0096125 | A1 | * | 5/2004  | Alderson et al. .............. 382/312 |
| 2011/0181791 | A1 | * | 7/2011  | Huang et al. ................. 348/744 |

* cited by examiner

*Primary Examiner* — Anand Bhatnagar  
(74) *Attorney, Agent, or Firm* — Hovey Williams LLP

(57) ABSTRACT

A system for correcting image characteristic data from a plurality of pixels comprises at least one field programmable gate array (FPGA), a lookup table, and a correction module. The FPGA may include a plurality of configurable logic elements and a plurality of configurable storage elements. The lookup table may be accessible by the FPGA and may store a plurality of correction components associated with each pixel, including a gain value, an offset value, and a bad pixel value. The correction module may be formed from the configurable logic elements and configurable storage elements and may receive the characteristic data and the correction components. The correction module may generate corrected data for each characteristic data by utilizing the gain value, the offset value, and the bad pixel value.

21 Claims, 6 Drawing Sheets

SYSTEM FOR NON-UNIFORMITY CORRECTION FOR IMAGE PROCESSING

BACKGROUND OF THE INVENTION

1. Field of the Invention

Embodiments of the present invention relate to image processing. More particularly, embodiments of the present invention relate to performing a correction on an image due to non-uniformity of the image source utilizing a field programmable gate array system.

2. Description of the Related Art

Imaging sensors typically include a plurality of light detecting elements, also known as picture elements or "pixels". The pixels are usually arranged in an array, for example, a rectangular X×Y frame. When the array is exposed to a subject of interest, each pixel captures a certain amount of light to form an image. Imaging sensors may include non-uniformities that are inherent in the composition of the sensor. For the image to be properly viewed or evaluated, the non-uniformities should be corrected.

Image correction may involve processing the entire frame of pixels, wherein the characteristic data, such as brightness or color, of at least a portion of the pixels in the frame is adjusted by a gain factor or an offset value. Traditional approaches to image correction have utilized computer processing techniques, wherein the adjustment may be performed in software executed in a serial fashion. As the frame size gets large, the processing time for each frame increases. Furthermore, moving image video requires that many successive frames of video data are captured every second (standard rates include 24 frames per second (fps), 30 fps, and 100 fps). A problem may occur if a first frame of video data is not processed by the time a second frame of data is ready for processing. Data may be lost or entire frames may not be processed with the result of poor viewing quality of the video or repeated interruptions in viewing. Alternatively, the video data may be captured and stored for offline processing and viewing at a later time. However, this approach sacrifices real-time processing and viewing, which could delay vital decision making based on the content of the video.

SUMMARY OF THE INVENTION

Embodiments of the present invention solve the above-mentioned problems and provide a distinct advance in the art of image processing. More particularly, embodiments of the invention provide a field programmable gate array system that performs a correction on characteristic data of an array of pixels due to non-uniformity of the pixel array.

Various embodiments of the system of the present invention comprise at least one field programmable gate array (FPGA), a lookup table, an input router, a correction module, a lookup table interface, and an output module.

The FPGA may include a plurality of configurable logic elements and a plurality of configurable storage elements. The lookup table may be accessible by the FPGA and may store a plurality of correction components associated with each pixel, including a gain value, an offset value, and a bad pixel value. The lookup table interface may be formed within the FPGA and may control the transfer of the correction components from the lookup table to the correction module.

The input router may be formed from the configurable logic elements and may receive the characteristic data and may generate a plurality of data streams, wherein each data stream includes a portion of the characteristic data.

The correction module may be formed from the configurable logic elements and configurable memory elements and may include a plurality of buffers, a multiplier, an adder, and a multiplexer. The buffers may store a portion of the correction components, wherein a first buffer stores gain values and bad pixel values, a second buffer stores a first portion of the offset values, and a third buffer stores a second portion of the offset values. The multiplier may multiply the characteristic data by the gain to produce a product. The adder may add the product to the offset value to produce a sum. The multiplexer may generate the corrected data by selecting the sum or the corrected data from another pixel based on the bad pixel value. The output module transmits the corrected data to an external destination.

In other embodiments, the system includes a plurality of FPGAs, a plurality of lookup tables, a plurality of lookup table interfaces, a plurality of inter FPGA links, the input router, the correction module, and the output module. The system may function similarly to the one described above, except as follows. The lookup tables may store various portions of the correction components wherein a first lookup table may store the gain values and the bad pixel values, a second lookup table may store a first portion of the offset values, and a third lookup table may store a second portion of the offset values. Each FPGA may include at least one lookup table interface, which may control the transfer of the correction components from each lookup table to the correction module. Each FPGA may also include at least one inter FPGA link which may allow communication from one FPGA to another FPGA.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
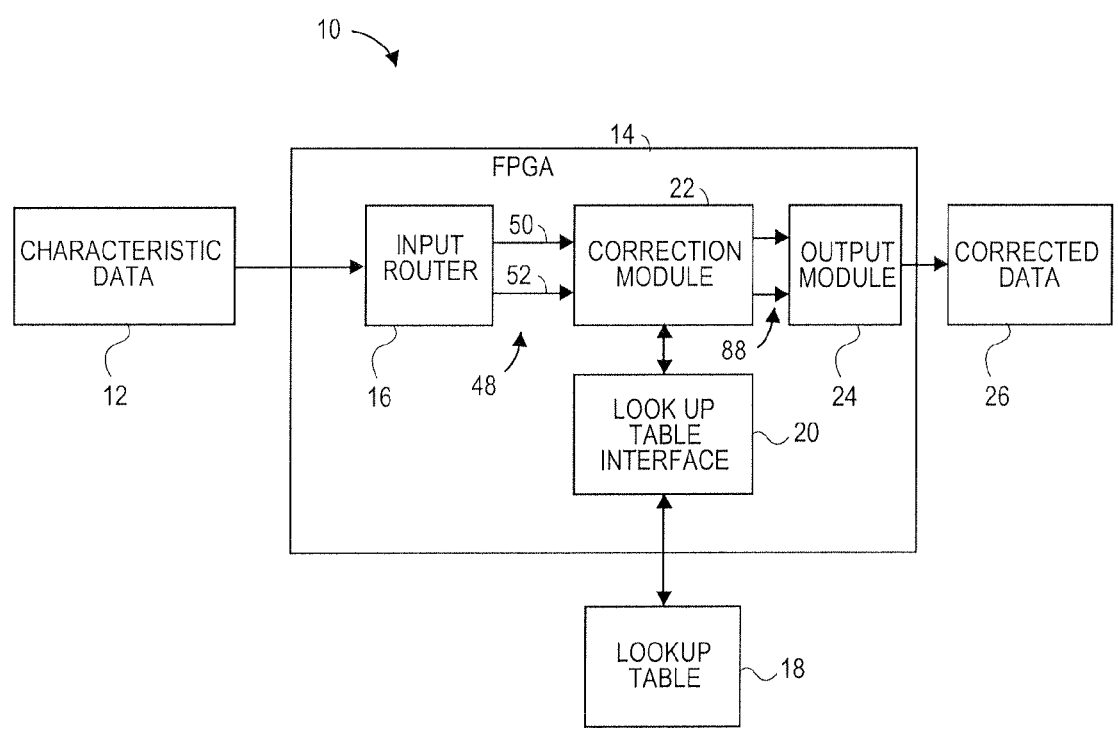
FIG. 1 is a block diagram of a system for correcting image characteristic data from a plurality of pixels that is constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A system 10 for non-uniformity correction of characteristic data 12 for image processing as constructed in accordance with various embodiments of the present invention is shown in FIG. 1. The system 10 may broadly comprise at least one field programmable gate array (FPGA) 14, an input router 16, a lookup table 18, a lookup table interface 20, a correction module 22, and an output module 24. The system 10 receives characteristic data 12 from an external source, performs a correction process, and produces a corrected data 26, as more fully described below.

Figure 2:
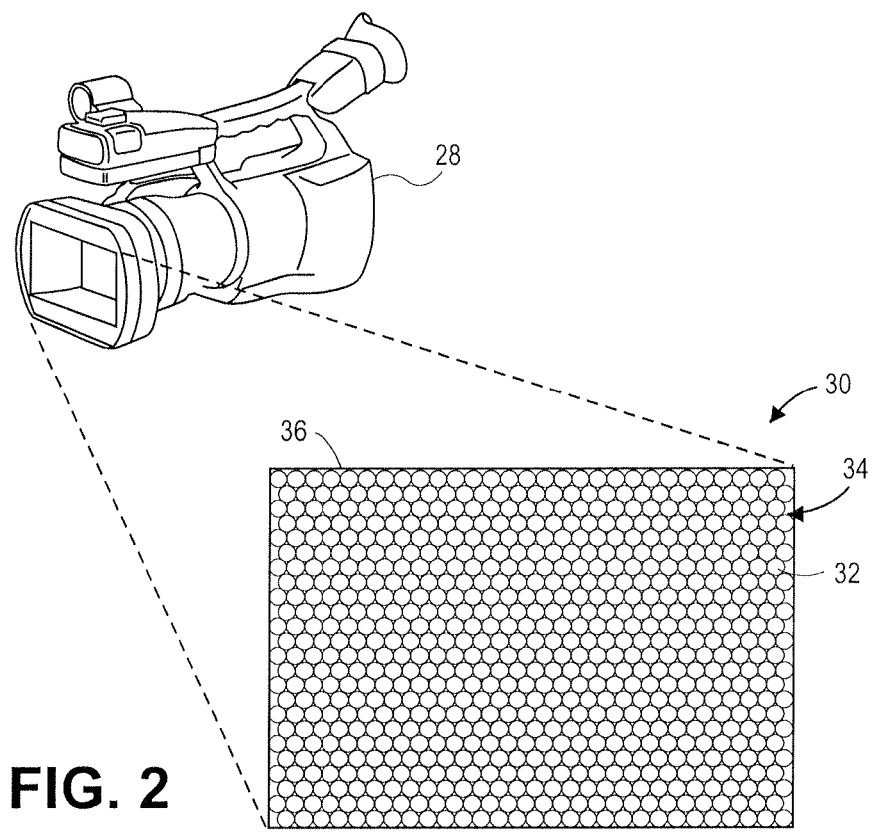
FIG. 2 is a schematic diagram of a video capture device that includes a video sensor with a plurality of picture elements (pixels)

An image may be captured by a video capture device 28, such as a digital video camera or camcorder, or a digital photography camera, as seen in FIG. 2. The video capture device 28 may include a video sensor 30, which is sensitive to electromagnetic radiation of various wavelengths. Some video sensors 30 may be sensitive to visible light wavelengths, while other sensors 30 may be used for thermal imaging and are sensitive to infrared wavelengths. The video sensor 30 may include a plurality of picture elements ("pixels") 32 arranged in an array 34 within a frame 36. The frame 36 may be either rectangular or square. The video capture device 28 may capture successive frames 36 of video images at arbitrary or standard rates, such as 24 frames per second (fps), 30 fps, or 100 fps.

When the array 34 is exposed to a subject of interest, each pixel 32 captures a certain amount of radiation. Accordingly, each pixel 32 stores one or more values related to a characteristic of the radiation, such as the color, the brightness, etc., otherwise known as the characteristic data 12. However, due to manufacturing issues, installation problems, material limitations or defects, and the like, a portion of the pixels 32 in the array 34 may not capture and store the characteristic data 12 correctly. Some pixels 32 may be considered good but still may need an adjustment to the data that is stored, while other pixels 32 may be considered bad and may not function or may be stuck at a certain value thus requiring their data to be replaced or substituted. Therefore, characteristic data 12 of all the pixels 32 in the array 34 may be adjusted by one or more correction components 38, as discussed in more detail below.

Generally, the array 34 of pixels 32 is tested and evaluated before field usage or product distribution to determine which of the correction components 38 may need to be applied. The correction components 38 include a gain 40, an offset 42, and a bad pixel 44. The gain 40 is a value that may be multiplied by the characteristic data 12 in order to correct the data 12. In various embodiments, the gain 40 may have a range of values from 0 to approximately 2. The offset 42 is a value that may be added to the characteristic data 12 to provide correction. In various embodiments, the offset 42 may have a range of values from approximately −512 to approximately 511. The bad pixel 44 may be a flag-type indicator that the characteristic data 12 needs to be replaced. In various embodiments, the bad pixel 44 may be either 0 or 1, with a good pixel 32 typically being indicated by a bad pixel value of 0, and a defective pixel 32 being indicated by a bad pixel value of 1. There may be numerous replacement schemes that can be applied for the defective pixel 32. However, in various embodiments, the characteristic data 12 is replaced by the last good pixel, which is the corrected data 26 from the previous pixel 32 in the array 34.

Some pixels 32 in the array 34 may need their characteristic data 12 corrected by the gain 40, some pixels 32 may need correction by the offset 42, some pixels 32 may need both the gain 40 and offset 42 correction, and some pixels 32 may need neither correction. In addition, some pixels 32 may be bad pixels 32. After the array 34 is tested, the values of the correction components 38 (gain 40, offset 42, and bad pixel 44) for each pixel 32 may be stored in a lookup table 18, as discussed in more detail below. If a pixel 32 is good and needs no correction, the gain 40 may have a value of 1, the offset 42 may have a value of 0, and the bad pixel 44 may be set to 0.

Figure 3:
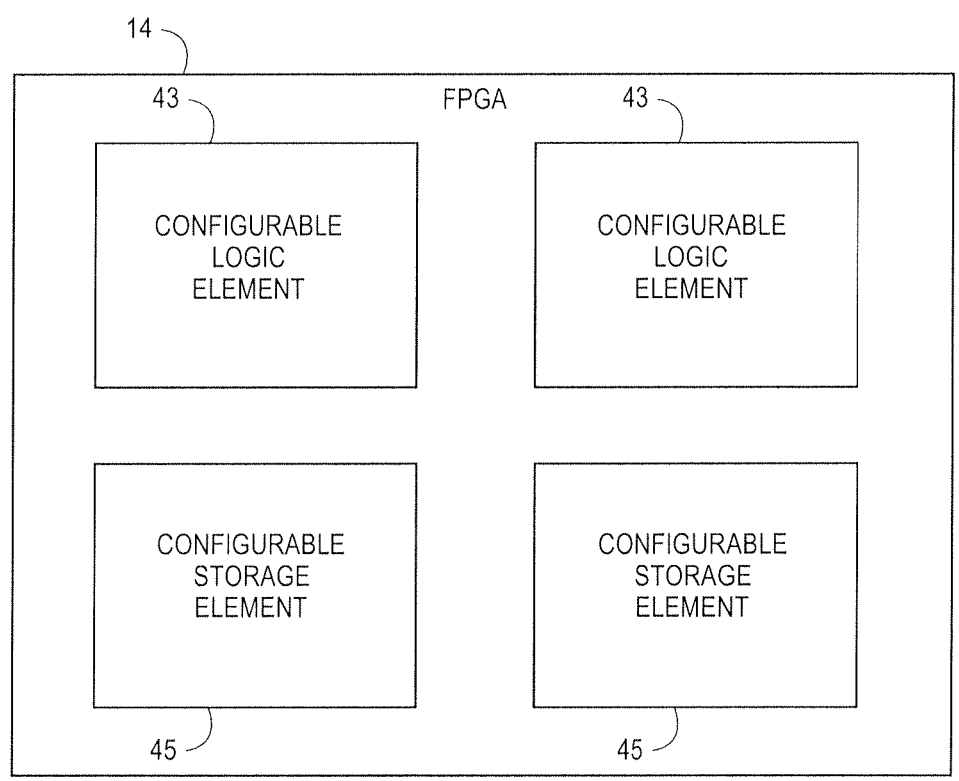
FIG. 3 is a block diagram of a field programmable gate array.

Referring back to the system 10, as shown in FIG. 1, the FPGA 14 generally provides the resources to implement the input router 16, the lookup table interface 20, and the correction module 22. The FPGA 14, as seen in FIG. 3, may include configurable logic elements 43 or blocks, such as standard gate array components that include combinational logic gates (e.g., AND, OR, and NOT) and latches or registers, programmable switch and interconnect networks, configurable storage elements 45 such as random-access memory (RAM) components, and input/output (I/O) pads. The FPGA 14 may also include specialized functional blocks such as arithmetic/logic units (ALUs) that include high-performance adders and multipliers, or communications blocks for standardized protocols. An example of the FPGA 14 is the Xilinx Virtex™ series, particularly the Virtex™2Pro FPGA, from Xilinx, Inc. of San Jose, Calif.

The FPGA 14 may be programmed in a generally traditional manner using electronic programming hardware that couples to standard computing equipment, such as a workstation, a desktop computer, or a laptop computer. The functional description or behavior of the circuitry may be programmed by writing code using a hardware description language (HDL), such as very high-speed integrated circuit hardware description language (VHDL) or Verilog, which is then synthesized and/or compiled to program the FPGA 14. Alternatively, a schematic of the circuit may be drawn using a computer-aided drafting or design (CAD) program, which is then converted into FPGA 14 programmable code using electronic design automation (EDA) software tools, such as a schematic-capture program. The FPGA 14 may be physically programmed or configured using FPGA programming equipment, as is known in the art.

The input router 16 generally receives the characteristic data 12 for the array 34 of pixels 32 from an external source and creates a plurality of data streams 48 to transmit to the correction module 22. In various embodiments, the input router 16 may create a first data stream 50 that includes the characteristic data 12 from the even pixels 32 and a second data stream 52 that includes the characteristic data 12 from the odd pixels 32. In other embodiments, the input router 16 may utilize a different scheme to partition the characteristic data 12 from the array 34 of pixels 32.

The input router 16 may include one or more of the following: multiplexers, demultiplexers, storage registers or buffers, shift registers, other serial-deserializer (SERDES) components, and combinations thereof, and may also be implemented through one or more code segments of an HDL. The input router 16 may further include various control logic elements, such as finite state machines (FSMs), to control the flow of the data streams 48 to the correction module 22.

Figure 4:
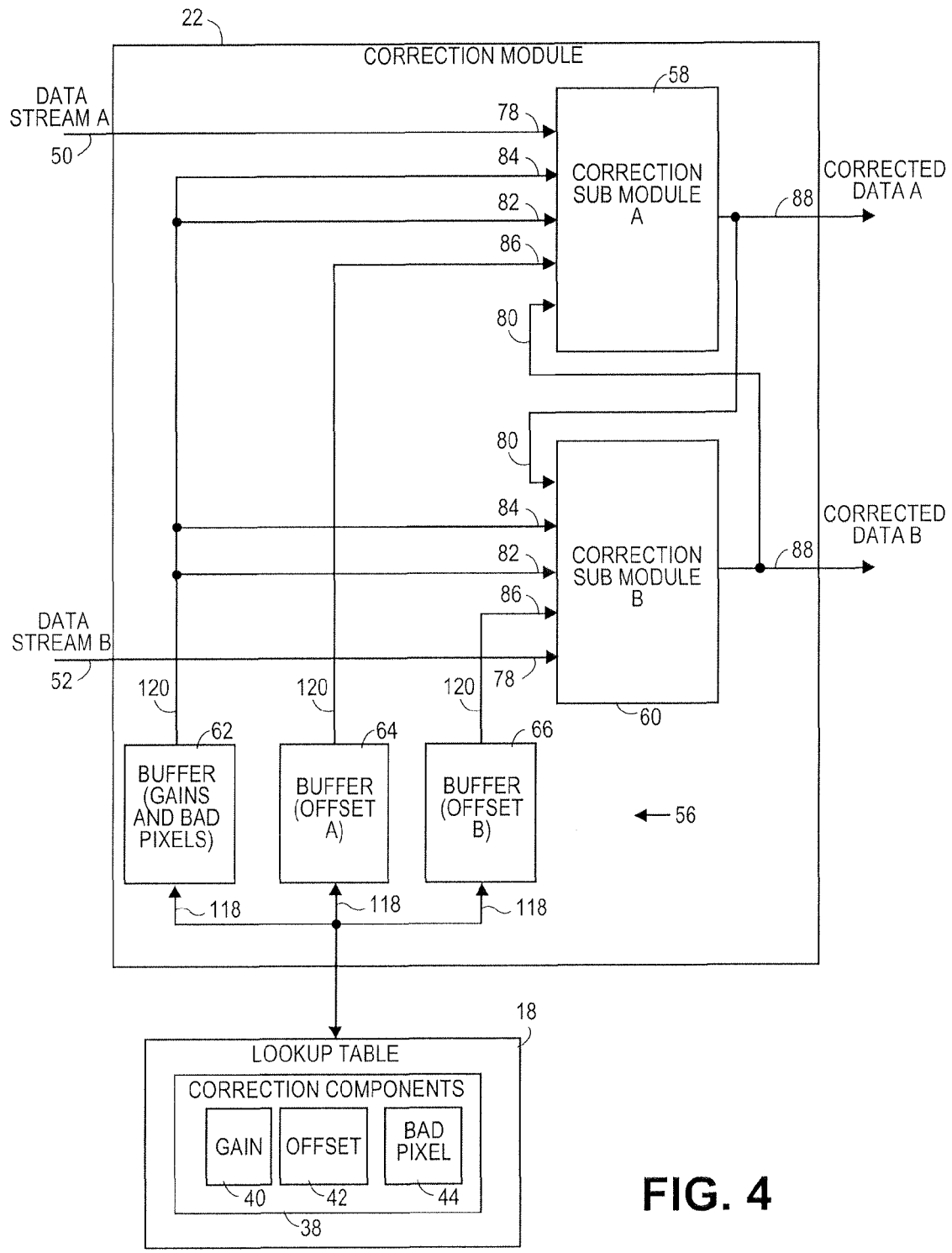
FIG. 4 is a block diagram of a correction module.

The correction module 22 generally receives the data streams 48 from the input router 16 and applies the correction components 38 to the characteristic data 12 for each pixel 32 to generate the corrected data 26. The correction module 22 may include one or more correction submodules 54 and one or more buffers 56, as seen in FIG. 4. In various embodiments, the correction module 22 may include a first correction submodule 58, a second correction submodule 60, a first buffer 62, a second buffer 64, and a third buffer 66. The correction module 22 may further include various control logic elements, such as finite state machines, to control the flow of data from the buffers 56 to the correction submodules 54, as well as to control the flow of correction components 38 from the lookup table 18.

Figure 5:
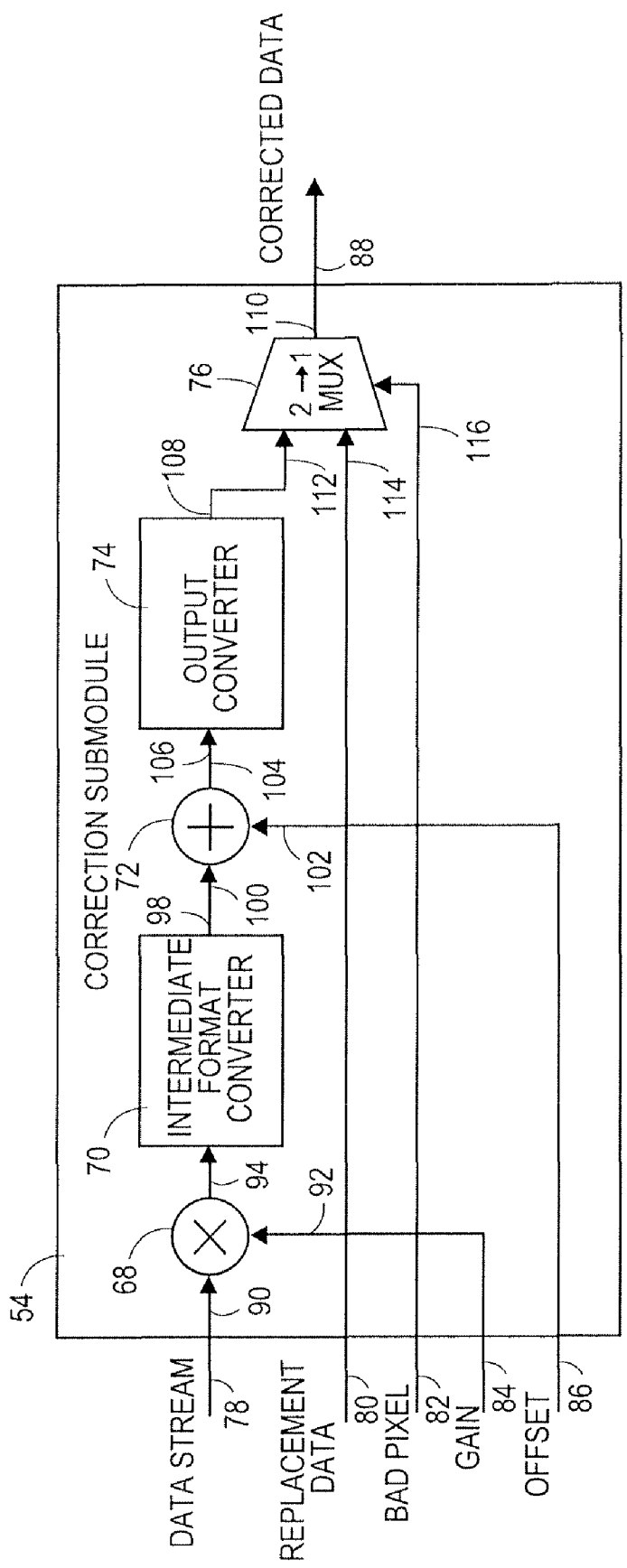
FIG. 5 is a block diagram of a correction submodule.

The correction submodule 54 generally receives one data stream 48 of characteristic data 12 as well as the correction components 38 to apply to each characteristic data 12 value. The correction submodule 54 generates corrected data 26 for each of the characteristic data 12 values in the data stream 48. The correction submodule 54 may include a multiplier 68, an intermediate format converter 70, an adder 72, an output converter 74, and a multiplexer 76, as seen in FIG. 5. The correction submodule 54 may also include a data stream input 78, a replacement data input 80, a bad pixel input 82, a gain input 84, an offset input 86, and a corrected data output 88.

The multiplier 68 generally multiplies a first input 90 by a second input 92 to produce a product 94. The multiplier 68 may receive the first input 90 from the data stream input 78 and the second input 92 may be received from gain input 84. The multiplier 68 may be formed from combinational logic and may include components such as adders and shift registers, as is known in the art. The multiplier 68 may also be implemented as a built-in component of the FPGA 14 or may be implemented through one or more code segments of an HDL. In various embodiments, the multiplier 68 may multiply a 16-bit first input 90 by a 16-bit second input 92 to produce a 32-bit unsigned product 94.

The intermediate format converter 70 generally converts an input 96 to a desired intermediate format number output 98, based on the multiplier output 94 and the data used by the adder 72. In various embodiments, the intermediate format converter 70 converts the input 96 to a two's complement number. For example, the intermediate format converter 70 may receive the product 94 in 32-bit unsigned form and convert it to a 33-bit two's complement output 98. The intermediate format converter 70 may include combinational logic gates such as AND, OR, and NOT as well as registers. The intermediate format converter 70 may also be implemented as a built-in component of the FPGA 14 or may be implemented through one or more code segments of an HDL.

The adder 72 generally adds a first input 100 to a second input 102 to produce a sum 104, as is known in the art. The first input 100 may be received from the intermediate format converter output 98. The second input 102 may be received from the offset input 86. The adder 72 may include one or more adding units and may be formed from combinational logic, or arithmetic blocks such as half adders, full adders, carry look ahead adders, or other generally known adders. Furthermore, the adder 72 may include a built-in adder component of the FPGA 14, and may further be implemented through one or more code segments of an HDL.

The output converter 74 generally converts an input 106 to any numeric format output 108. The output converter 74 may generate fixed-point numbers, floating-point numbers, signed numbers, unsigned numbers, integer numbers, rational numbers, etc. The output converter 74 may also round the data or truncate the data by removing bits or increase the resolution by adding bits. The output converter 74 may receive the sum 104 as the input 106, which is generally the characteristic data 12 that had a gain 40 correction and an offset 42 correction applied (i.e., the characteristic data 12 was not from a bad pixel 32). The output 108 may be converted to the desired numeric format of the external system that will utilize the corrected data 26. In various embodiments, the output converter 74 generates a 16-bit unsigned integer output 108.

The output converter 74 may include combinational logic gates, arithmetic units, such as adders, subtracters, and multipliers, shift registers, and combinations thereof. The output converter 74 may include built-in components of the FPGA 14, and may further be implemented through one or more code segments of an HDL.

The multiplexer 76 may generally produce an output 110 that is selected between a first input 112 and a second input 114 based on the value of a select line 116. The multiplexer 76 may receive the first input 112 from the output converter output 108 and the second input 114 from the replacement data input 80. The select line 116 may be received from the bad pixel input 82. The output 110 of the multiplexer 76 may be forwarded to the corrected data output 88. When the select line 116 is a zero, the output 110 receives data from the output converter output 108—indicating the characteristic data 12 was from a good pixel 32. When the select line 116 is a one, the output 110 receives data from the replacement data input 80—indicating that the current pixel 32 is a bad pixel 32 and that the characteristic data 12 from that pixel 32 should be not corrected, but rather should be replaced.

The multiplexer 76 may include or be formed from combinational logic gates, such as AND, OR, and NOT, and may include built-in components of the FPGA 14, and may further be implemented through one or more code segments of an HDL.

Referring back to the correction module 22 of FIG. 4, the buffers 56 may generally store a portion of the correction components 38 data. Typically, the buffers 56 are not large enough to store all of the correction components 38, but act as a cache for the correction components 38. The buffers 56 may receive the correction components 38 from the lookup table 18 as determined by control logic in the correction module 22. Each buffer 56 may include a buffer input 118 to receive data from the lookup table 18 and a buffer output 120 to forward correction components 38 to the correction submodules 54.

The first buffer 62 may store the gain 40 value and the bad pixel 44 data for the pixels 32. In various embodiments, the first buffer 62 may be organized or structured such that each time the first buffer 62 is accessed, at least two gain 40 values and two bad pixel 44 flag values are supplied to the correction submodules 54. The second buffer 64 may store the offset 42 values for a first portion of the pixels 32. The third buffer 66 may store the offset 42 values for a second portion of the pixels 32, such that the first portion of the pixels 32 (from the second buffer 64) and the second portion in combination include all the pixels 32 in the array 34. In various embodiments, the second buffer 64 may stored offsets 42 for the even pixels 32, and the third buffer 66 may store the offsets 42 for the odd pixels 32.

Each buffer 56 may be formed from configurable storage elements 45, such as first-in first-out registers (FIFOs), random access memory (RAM), memory cells, registers, latches, flip-flops, and the like. The buffer 56 may also include built-in components of the FPGA 14, and may further be implemented through one or more code segments of an HDL.

The connection scheme of the correction module 22 may be as follows. The data stream input 78 of the first correction submodule 58 may be coupled to the first data stream 50. The gain input 84 and the bad pixel input 82 of the first correction submodule 58 may receive data from the buffer output 120 from the first buffer 62. The offset input 86 may receive data from the buffer output 120 from the second buffer 64. The replacement data input 80 may be coupled to the corrected data output 88 of the second correction submodule 60. The corrected data output 88 of the first correction submodule 58 may generate a portion of the corrected data 26. In various embodiments, the corrected data output 88 of the first correction submodule 58 may generate the corrected data 26 for the even pixels 32 of the array 34.

The data stream input 78 of the second correction submodule 60 may be coupled to the second data stream 50. The gain input 84 and the bad pixel input 82 of the second correction submodule 58 may receive data from the buffer output 120 from the first buffer 62. The offset input 86 may receive data from the buffer output 120 from the third buffer 66. The replacement data input 80 may be coupled to the corrected data output 88 of the first correction submodule 60. The corrected data output 88 of the second correction submodule 60 may generate a portion of the corrected data 26. In various embodiments, the corrected data output 88 of the second correction submodule 60 may generate the corrected data 26 for the odd pixels 32 of the array 34.

The output module 24 generally combines the corrected data output 88 from the first correction submodule 58 and the second correction submodule 60 to form the corrected data 26. The output module 24 may put the corrected data 26 in the proper order and may synchronize it before transmitting the corrected data 26 to an external destination. The output module 24 may include combinational logic gates, buffers, registers, FIFO registers, shift registers, memory cells, and combinations thereof. The output module 24 may also include built-in components of the FPGA 14, and may further be implemented through one or more code segments of an HDL.

The lookup table 18 generally stores all the correction components 38 for all the pixels 32 in the array 34. The correction components 38 might include a large amount of data if the size of the array 34 is very large or if the resolution of the gain 40 and offset 42 values is large. Thus, it is most likely that the lookup table 18 is not stored on the FPGA 14. As a result, the correction module 22 may communicate with the lookup table 18 through the lookup table interface 20.

The lookup table 18 may include RAM elements, read-only memory (ROM) elements, programmable ROM (PROM) elements, registers, flip-flops, floppy disks, hard-disk drives, optical disks, or combinations thereof. In some embodiments, the system 10 includes a single lookup table 18 as shown in FIG. 1. In such embodiments, each address of the lookup table 18 may include the gain 40 values, the offset 42 values, and the bad pixel 44 values for one or more pixels 32. These values may be supplied to the first buffer 62, the second buffer 64, and the third buffer 66 as the values are used in the correction process. Thus, the values may be streamed from the lookup table 18 to the buffers 56 in a nearly continuous fashion or at least at regular intervals.

The lookup table interface 20 generally manages the communication between the lookup table 18 and the correction module 22, and thus to the first buffer 62, the second buffer 64, and the third buffer 66 within the correction module 22. The lookup table interface 20 may send a request to the lookup table 18 to forward the next group of correction components 38 to the correction module 22. In addition, the lookup table interface 20 may synchronize and temporarily buffer the correction components 38. The lookup table interface 20 may include combinational logic gates, buffers, registers, FIFO registers, control logic such as FSMs, and the like. The lookup table interface 20 may also include built-in components of the FPGA 14, and may further be implemented through one or more code segments of an HDL.

Figure 6:
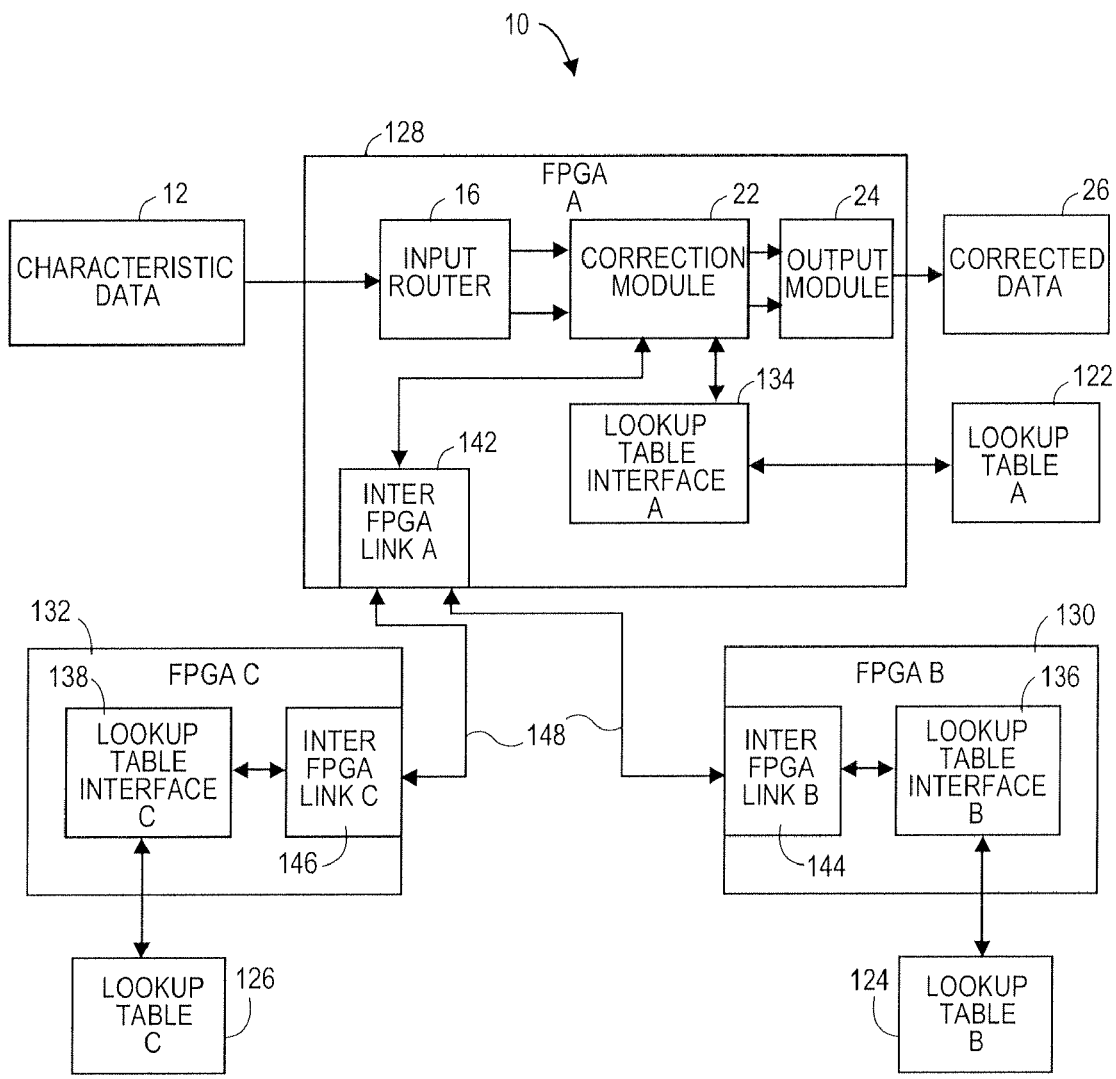
FIG. 6 is a block diagram of another embodiment of the system.

In other embodiments, if the lookup table 18 is particularly large, the lookup table 18 may be partitioned to include a first lookup table 122, a second lookup table 124, and a third lookup table 126, as shown in FIG. 6. In such embodiments, the system 10 may also include a first FPGA 128, a second FPGA 130, a third FPGA 132, a first lookup table interface 134, a second lookup table interface 136, a third lookup table interface 138, and a plurality of inter FPGA links 140 with a first inter FPGA link 142, a second inter FPGA link 144, and a third inter FPGA link 146.

The first FPGA 128 may include the input router 16 and the correction module 22, as described above. The first FPGA 128 may also include the first inter FPGA link 142 and the first lookup table interface 134, which is coupled to the first lookup table 122. The second FPGA 128 may include the second inter FPGA link 144 and the second lookup table interface 136 coupled to the second lookup table 124. The third FPGA 132 may include the third inter FPGA link 146 and the third lookup table interface 138 coupled to the third lookup table 126.

The lookup table 18 may be divided such that the first lookup table 122 may store the gain 40 values and the bad pixel 44 values for all the pixels 32 in the array 34 such that the first lookup table 18 can supply data to the first buffer 62 of the correction module 22. The second lookup table 124 may store the offset 42 values for the even pixels 32 in the array 34 and supplies data to the second buffer 64. Likewise, the third lookup table 126 may store the offset 42 values for the odd pixels 32 in the array 34 and supplies data to the third buffer 66.

The inter FPGA link 140 generally allows communication from the components, such as the correction module 22, on one FPGA 14 to the components, such as the lookup table interface 20, on another FPGA 14. The inter FPGA link 140 may buffer the data and add packet data, serialize the data, or otherwise prepare the data for transmission.

The inter FPGA link 140 may include buffers in the form of flip-flops, latches, registers, SRAM, DRAM, and the like, as well as shift registers or SERDES components. The inter FPGA link 140 may be a built-in functional FPGA block or may be formed from one or more code segments of an HDL or one or more schematic drawings. The inter FPGA link 140 may also be compatible with or include Gigabit Transceiver (GT) components, as are known in the art. The inter FPGA link 140 may couple to the correction module 22 or the lookup table interface 20 within an FPGA 14. The inter FPGA link 140 may couple to an inter FPGA bus 148 to communicate with another FPGA 14.

The inter FPGA bus 148 generally carries data from one FPGA 14 to another FPGA 14 and is coupled with the inter FPGA link 140 of each FPGA 14. The inter FPGA bus 148 may be a single-channel serial line, wherein all the data is transmitted in serial fashion, a multi-channel (or multi-bit) parallel link, wherein different bits of the data are transmitted on different channels, or variations thereof, wherein the inter FPGA bus 148 may include multiple lanes of bidirectional data links. The inter FPGA bus 148 may be compatible with GTP components included in the inter FPGA link 140. The inter FPGA link 140 and the inter FPGA bus 148 may also be implemented as disclosed in U.S. Pat. No. 7,444,454, issued Oct. 28, 2008, which is hereby incorporated by reference in its entirety.

The system 10 may operate as follows. The array 34 of pixels 32 from a video sensor 30 may be tested and characterized, perhaps shortly after manufacture, such that correction components 38 may be determined for each pixel 32. The correction components 38 may include the gain 40 value, the offset 42 value, and the bad pixel 44 value. The correction components 38 may be stored in the lookup table 18. If the array 34 is large or high-resolution correction is desired, then the correction components 38 may be stored in three lookup tables 18. The first lookup table 122 may store the gain 40 values and the bad pixel 44 values for the array 34. The second lookup table 124 may store the offset 42 values for a portion of the array 34, and the third lookup table 126 may store the offset 42 values for the rest of the array 34 of pixels 32.

The initial portion of the correction components 38 may be loaded from the lookup table 18 into the buffers 56 when the system 10 starts up or when a frame 36 of characteristic data 12 has been corrected. The first buffer 62 may receive gain 40 and bad pixel 44 values. The second buffer 64 and the third buffer 66 may receive the offset 42 values. In addition, the buffers 56 may be updated with current correction components 38 from the lookup table 18 as the correction process continues.

Characteristic data 12 for each pixel 32 in the array 34 may be streamed to the system 10 from an external source. The input router 16 may receive the characteristic data 12 and split the data 12 to create a plurality of data streams 48, wherein each stream 48 includes a portion of the characteristic data 12. Each correction submodule 54 of the correction module 22 may receive a data stream 48.

The characteristic data 12 may first be multiplied by the gain 40 value by the multiplier 68 and then converted to a convenient intermediate format by the intermediate format converter 70. Then, the characteristic data 12 may be added to the offset 42 value by the adder 72 followed by converting the sum to a desired output format by the output converter 74. The corrected data 26 is selected from the output 108 of the output converter 74 if the pixel 32 is considered to be good as indicated by a bad pixel 44 value of zero. The corrected data 26 is selected from the replacement data input 80 if the pixel 32 is considered to be bad as indicated by a bad pixel 44 value of one. The corrected data output 88 from each correction submodule 54 is then combined by the output module 24 to form the corrected data 26, which is transmitted to an external destination.

Figure 7:
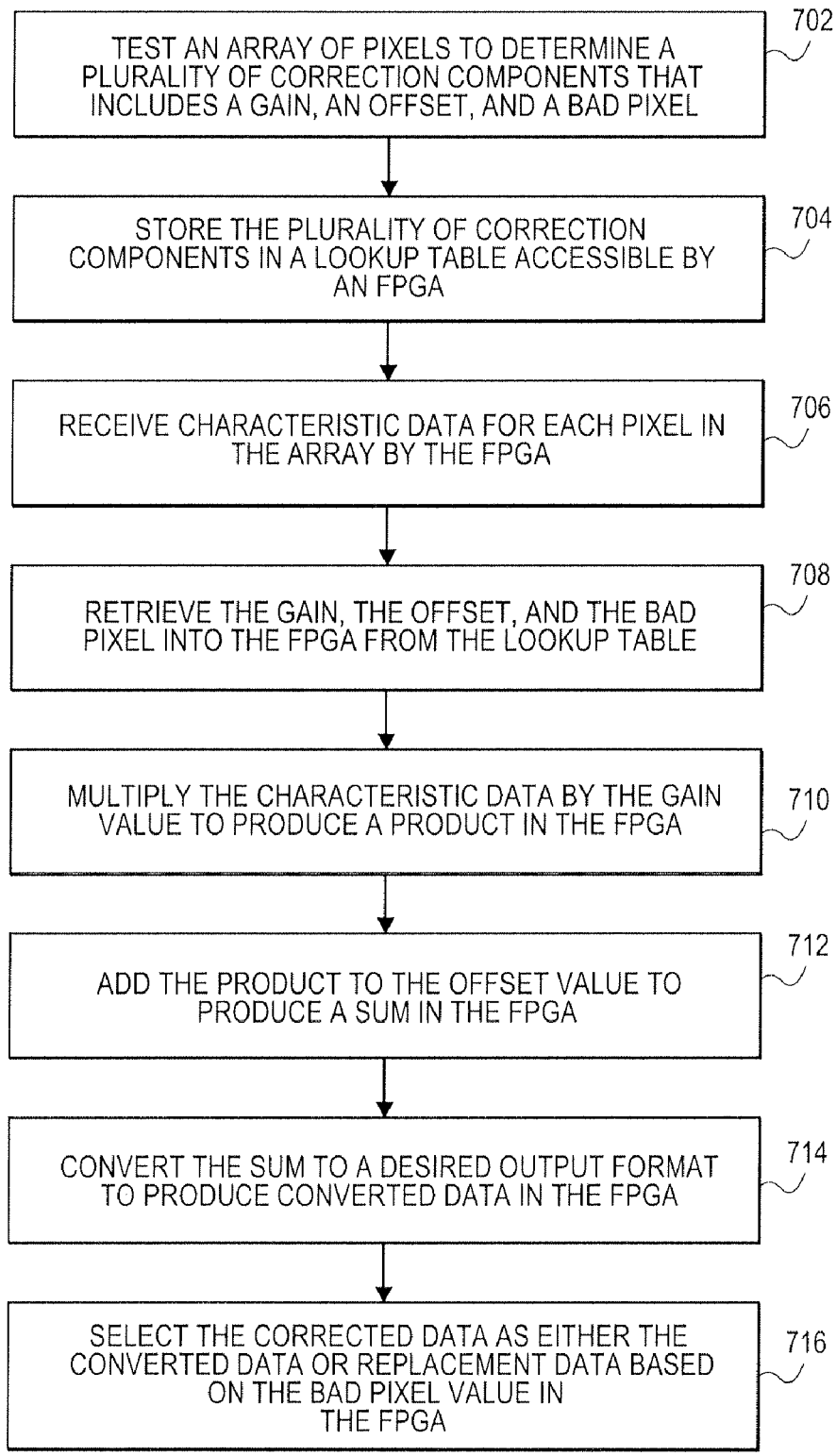
FIG. 7 is a flow diagram of at least a portion of the steps performed for a method correcting image characteristic data from a plurality of pixels.

At least a portion of the steps of a method 700 of correcting image data in accordance with various embodiments of the present invention is shown in FIG. 7. The steps as shown in FIG. 7 do not imply a particular order of execution. Some steps may be performed concurrently instead of sequentially, as shown. Additionally, some steps may be performed in reverse order from what is shown in FIG. 7.

In connection with step 702, the array 34 of pixels 32 is tested to determine a plurality of correction components 38, including the gain 40, the offset 42, and the bad pixel 44, for each pixel 32. In connection with step 704, the plurality of correction components 38 is stored in the lookup table 18.

In connection with step 706, characteristic data 12 for each pixel 32 in the array 34 is received from an external source. In various embodiments, a plurality of data streams 48 may be generated, with each stream 48 including a portion of the characteristic data 12. In connection with step 708, the gain 40 values, the offset 42 values, and the bad pixel 44 values are retrieved from the lookup table 18 into the FPGA 14. The correction components 38 are stored in the buffers 56.

In connection with step 710, the characteristic data 12 is multiplied by the gain 40 value, which yields the product 94. The multiplication may be performed by the multiplier 68 and may be followed by a numeric format conversion performed by the intermediate format converter 70. In connection with step 712, the converted product 98 is added to the offset 42 value. The addition may be performed by the adder 72, which produces the sum 104. In connection with step 714, the sum 104 is converted to a desired output format, based on the numeric format of the system that receives the corrected data 26. The conversion is performed by the output converter 74 and produces the converted output 108.

In connection with step 716, the corrected data 26 is selected as either the converted data output 108 or the corrected data 26 from another pixel 32, based on the bad pixel 44 value. If the bad pixel 44 value for the current pixel 32 is zero, then the corrected data 26 is the converted data output 108. If the bad pixel 44 value is one, then the corrected data 26 is the replacement data input 80 which may include the corrected data 26 from another pixel 32. The corrected data 26 may then be transmitted to an external destination by the output module 24.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for correcting image characteristic data from a plurality of pixels, the system comprising:
    at least one field programmable gate array (FPGA) including a plurality of configurable logic elements and a plurality of configurable storage elements;
    a lookup table accessible by the at least one FPGA and configured to store a plurality of correction components associated with each pixel, the correction components including a gain value, an offset value, and a bad pixel value; and
    a correction module formed from the configurable logic elements and configured to produce corrected data for at least a portion of the pixels, the correction module including a multiplier to multiply the characteristic data by the gain value to produce a product, an adder to add the product to the offset value to produce a sum, and a multiplexer to generate the corrected data by selecting the sum or a replacement data based on the bad pixel value.

2. The system of claim 1, wherein the corrected data for the pixel is the sum if the bad pixel value is a first value, and the corrected data is the replacement data if the bad pixel value is a second value.

3. The system of claim 1, wherein the replacement data is the corrected data from another pixel.

4. The system of claim 1, further including an input router formed from the configurable logic elements and configured to receive the characteristic data and generate a plurality of data streams to be received by the correction module, wherein each data stream includes a portion of the characteristic data.

5. The system of claim 1, wherein the correction module further includes a plurality of buffers formed from the configurable storage elements and configured to store a portion of the correction components, wherein a first buffer stores gain values and bad pixel values, a second buffer stores a first portion of the offset values, and a third buffer stores a second portion of the offset values.

6. The system of claim 1, further including a lookup table interface formed from configurable logic elements and configured to control the flow of the correction components from the lookup table to the correction module.

7. The system of claim 1, wherein the correction module further includes a first correction submodule and a second correction submodule, both formed from configurable logic elements, the first correction submodule configured to generate a first corrected data output corresponding to a first portion of the characteristic data and the second correction submodule configured to generate a second corrected data output corresponding to a second portion of the characteristic data.

8. The system of claim 7, further including an output module formed from configurable logic elements and configured to properly order and synchronize the first corrected data output and the second corrected data output.

9. A system for correcting image characteristic data from a plurality of pixels, the system comprising:
 a plurality of field programmable gate arrays (FPGAs), each including a plurality of configurable logic elements and a plurality of configurable storage elements;
 an input router formed from the configurable logic elements and configured to receive the characteristic data and generate a plurality of data streams, wherein each data stream includes a portion of the characteristic data;
 a plurality of lookup tables accessible by the plurality of FPGAs and configured to store a plurality of correction components associated with each pixel, the correction components including a gain value, an offset value, and a bad pixel value;
 a plurality of lookup table interfaces each lookup table interface formed within one FPGA and configured to control the transfer of the correction components from one lookup table; and
 a correction module formed from the configurable logic elements and configurable memory elements and configured to receive the data streams and the correction components, the correction module including
  a first buffer configured to store a portion of the gain values and a portion of the bad pixel values,
  a second buffer configured to store a first portion of the offset values,
  a third buffer configured to store a second portion of the offset values,
  a multiplier to multiply the characteristic data by the gain value to produce a product,
  an adder to add the product to the offset value to produce a sum, and
  a multiplexer to generate the corrected data by selecting the sum or a replacement data based on the bad pixel value.

10. The system of claim 9, wherein the corrected data for the pixel is the sum if the bad pixel value is a first value, and the corrected data is the replacement data if the bad pixel value is a second value.

11. The system of claim 9, wherein the replacement data is the corrected data from another pixel.

12. The system of claim 9, wherein the plurality of lookup tables includes a first lookup table to store the gain values and the bad pixel values, a second lookup table to store a first portion of the offset values, and a third lookup table to store a second portion of the offset values.

13. The system of claim 9, further including a plurality of inter FPGA links, each inter FPGA link included within one FPGA and configured to allow communication from one FPGA to another FPGA.

14. The system of claim 9, wherein the correction module further includes a first correction submodule and a second correction submodule, both formed from configurable logic elements, the first correction submodule configured to generate a first corrected data output corresponding to a first portion of the characteristic data and the second correction submodule configured to generate a second corrected data output corresponding to a second portion of the characteristic data.

15. The system of claim 14, further including an output module formed from configurable logic elements and configured to properly order and synchronize the first corrected data output and the second corrected data output.

16. A method of correcting image characteristic data from a plurality of pixels, the method comprising the steps of:
 a) testing an array of pixels to determine a plurality of correction components for each pixel including a gain value, an offset value, and a bad pixel value;
 b) storing the plurality of correction components in a lookup table that is accessible by a field programmable gate array (FPGA);
 c) receiving the characteristic data for each pixel in the array by the FPGA,
 d) multiplying the characteristic data from a current pixel by the gain value to produce a product in the FPGA;
 e) adding the product to the offset value to produce a sum in the FPGA; and
 f) selecting a corrected data as either the sum or a replacement data based on the bad pixel value in the FPGA.

17. The method of claim 16, wherein the corrected data is the sum if the bad pixel value is a first value, and the corrected data is the replacement data if the bad pixel value is a second value.

18. The system of claim 16, wherein the replacement data is the corrected data from another pixel.

19. The method of claim 16, further including the step of converting the sum to a desired output format in the FPGA.

20. The method of claim 16, further including the step of retrieving the gain values, the offset values, and the bad pixel values into the FPGA from the lookup table.

21. The method of claim 16, further including the step of generating a plurality of data streams, wherein each data stream includes a portion of the characteristic data.

* * * * *